March 19, 1957  C. A. MOUNTEER ET AL  2,785,570
PRESSURE RESPONSIVE INDICATING MEANS
Filed April 22, 1954  4 Sheets-Sheet 1

Fig. 1.

CARLYLE A. MOUNTEER,
CONSTANT J. CHRONES,
JOSEPH F. MANILDI,
WALTER I. SHEVELL,
INVENTORS.

BY
Berkelew + Scantlebury
ATTORNEYS.

March 19, 1957 C. A. MOUNTEER ET AL 2,785,570
PRESSURE RESPONSIVE INDICATING MEANS
Filed April 22, 1954 4 Sheets-Sheet 2

Fig. 2

CARLYLE A. MOUNTEER,
CONSTANT J. CHRONES,
JOSEPH F. MANILDI,
WALTER I. SHEVELL,
INVENTORS.

BY

Berkelew & Scantlebury
ATTORNEYS.

March 19, 1957 C. A. MOUNTEER ET AL 2,785,570
PRESSURE RESPONSIVE INDICATING MEANS
Filed April 22, 1954 4 Sheets-Sheet 3

CARLYLE A. MOUNTEER,
CONSTANT J. CHRONES,
JOSEPH F. MANILDI,
WALTER I. SHEVELL,
INVENTORS.

BY
Bartholow & Scantlebury
ATTORNEYS.

March 19, 1957  C. A. MOUNTEER ET AL  2,785,570
PRESSURE RESPONSIVE INDICATING MEANS
Filed April 22, 1954  4 Sheets-Sheet 4

CARLYLE A. MOUNTEER,
CONSTANT J. CHRONES,
JOSEPH F. MANILDI,
WALTER I. SHEVELL,
INVENTORS.

BY
ATTORNEYS.

United States Patent Office 2,785,570
Patented Mar. 19, 1957

---

2,785,570

PRESSURE RESPONSIVE INDICATING MEANS

Carlyle A. Mounteer and Constant J. Chrones, Pasadena, Joseph F. Manildi, Sherman Oaks, and Walter I. Shevell, South Pasadena, Calif., assignors to G. M. Giannini & Co., Inc., Pasadena, Calif., a corporation of New York Application April 22, 1954, Serial No. 425,011

5 Claims. (Cl. 73—182)

This invention is concerned generally with mechanism responsive to variations of fluid pressure.

The invention is concerned more particularly with such mechanism that is capable of producing one or more electrical signals that represent a definite function of a plurality of controlling fluid pressures.

The invention includes means for producing an electrical output signal that normally varies continuously in response to continuous variations of the control pressures, and means for producing abrupt changes in the nature of the output signal in response to some definite condition of the pressures. Within the broader scope of the invention, those two aspects of the invention may be embodied either separately or in combination.

A primary purpose of the invention is to produce an electrical output signal that represents a definite function of the Mach number of an aircraft in flight in response to two distinct input pressures, which may be the static pressure and the stagnation pressure obtained from the atmosphere through which the aircraft is flying. Moreover, the invention permits the production of such a signal having one type of dependence upon Mach number below a predetermined critical value, and having another type of dependence upon Mach number above that critical value.

A particular object of the invention is to provide, by means of simple, economical and reliable means, a signal that is substantially linear function of Mach number within an appreciable range of variation of that number.

A further object of the invention is to provide reliable and accurate means for translating the movement of a pressure responsive device, such as an axially expansible capsule, into the form of an electrical signal, and to provide convenient and precise adjustment of the operation of that translating means.

The invention is concerned further with the provision of a switch that is operable jointly in response to two distinct pressure responsive means.

More particularly, the invention provides such a switch having adjustments by which it can be made to respond to movements derived from static and stagnation pressures in such a way that switch operation occurs at a substantially uniform and predetermined value of Mach number. The invention further provides in one simple and convenient instrument such switch action in combination with development of continuously varying signals of the type already referred to. The invention further provides improved features of structure and arrangement of parts in apparatus of the general type described.

A clear and full understanding of the invention, and of its further objects and advantages, will be had from the following detailed description of a particular, illustrative embodiment of the invention, of which description the accompanying drawings form a part. The particulars of that description are intended only as illustration of the invention, representing the best manner now contemplated for carrying it out, and are not to be interpreted as a limitation upon its scope, which is defined by the appended claims.

In the drawings a rigid main frame is indicated generally by the numeral 20. That frame is preferably fabricated as several separable sections to facilitate assembly and adjustment of the moving parts to be described. As illustrated, the frame comprises a base frame 22, a central frame 24 releasably mounted on the base frame by the screws 25, and an end frame 26 releasably mounted on the central frame by the screws 27. Frame 20 has a longitudinal axis indicated at 28. Base frame 22 comprises a base plate portion 21, which forms one end of the instrument housing and may include an external mounting flange 21a, and a cylindrical shell portion 23 coaxial with axis 28 and threaded at 29 to receive a cylindrical cover 30 of cup shape which completes the instrument housing. An O-ring 31 pressure seals the assembled housing. Shell portion 23 of the base frame is preferably cut away outwardly of threads 29, as indicated at 32 in Figs. 2 and 3, to provide access to its interior when cover 30 is removed.

Central frame 24 comprises a transverse web or plate 34 and two longitudinally extending post portions 36, which may be considered to constitute a fragmentary cylinder coaxial with axis 28 the greater part of which has been cut away to provide access to the interior. End frame 26 comprises a transverse web or plate 38, which may have the same form as web 34 and performs a similar function, and a bracket 39 of general U-form. Bracket 39 may be considered as a cylindrical housing, a large part of which has been cut away to provide access to the interior.

Two pressure responsive devices are mounted on frame 20 for cooperative action to be described. Many different types of pressure responsive devices are known for producing mechanical movement that represents the difference between two fluid pressures, including, for example, diaphragms, Bourdon tubes, and axially expansible capsules and bellows. For purposes of illustration, and without implying any necessary limitation upon the invention, the present embodiment employs axially expansible capsules for that purpose, each capsule being shown typically as comprising two units. An inner capsule 40 has one end rigidly mounted, as by a fitting 43, on an axial boss 41 of frame plate 21 and is thereby supported coaxially of frame axis 28 within the partially enclosed chamber 42 formed between plate 21 and web 34. An outer capsule 44 is mounted coaxially with axis 28 and in opposing relation to inner capsule 40, with its outer end rigidly supported by the screw 45 on the inner face of bracket 39. The opposing free ends 46 and 47 of the two capsules are operatively connected to respective indicating means to be described, those means being capable of independent action or of cooperative action, as may be required.

Figure 1:
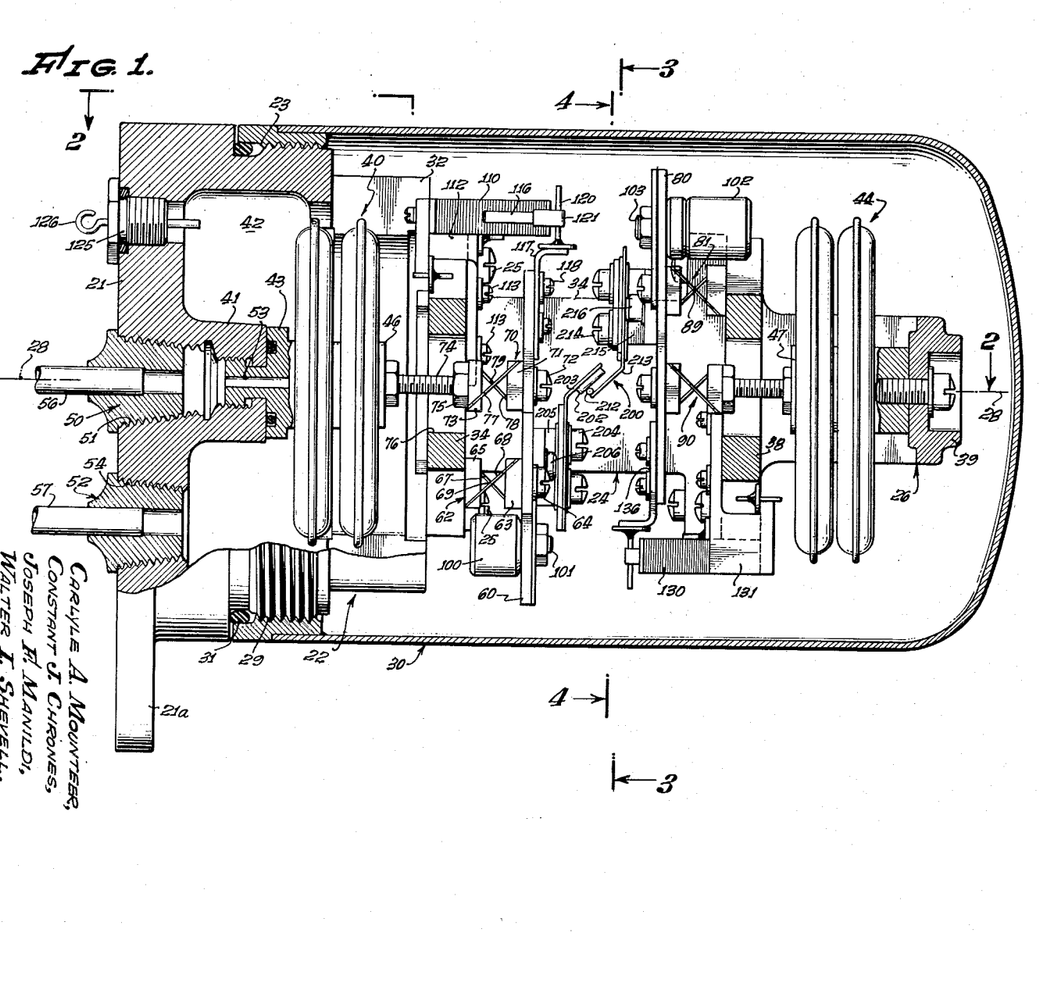
Fig. 1 is a vertical axial section of a preferred illustrative emodiment of the invention.
Figure 2:
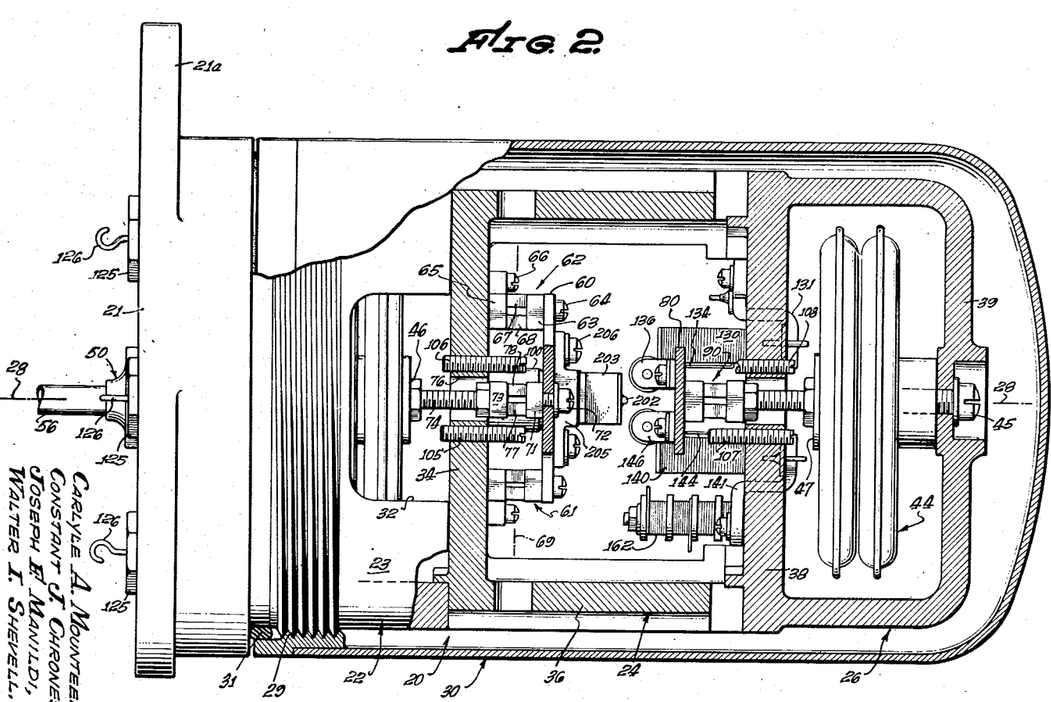
Fig. 2 is a horizontal section on line 2—2 of Fig. 1.

The fluid pressures supplied to the two pressure responsive means 40 and 44 may, within the broader scope of the invention, be of any type. However, when it is desired to produce an output responsive to Mach number (ratio of the true airspeed to the speed of sound) of an aircraft or the like, one of the pressure responsive means is connected to a source of fluid under stagnation or total pressure, herein designated $P_t$, and the other pressure responsive means is connected to a source of fluid under static pressure, herein designated $P_s$. It is broadly immaterial whether such pressures are applied to the interior or to the exterior of the respective capsules, or the like. For example, one of the said pressures may be applied to the interior of each of the capsules, and the exterior of both capsules may be exposed to a constant pressure, obtained, for example, by evacuating the space surrounding the capsules and inside the housing formed by frame 20 and cover 30. The preferred manner of applying the control pressures to the pressure responsive means is to supply fluid under static pressure to the space within the housing and outside the two capsules, so that the exterior of both capsules is exposed to static pressure; and to supply fluid under stagnation pressure to the interior of one of the capsules, typically inner capsule 40. The pressure within the other capsule 44 is held constant, preferably by evacuation. The free end 47 of outer capsule 44 then moves axially in response to static pressure, moving to the left in Figs. 1 and 2, for example, with decreasing static pressure, which corresponds to increasing altitude of the aircraft. Inner capsule 40 is then exposed externally to static pressure $P_s$ (like capsule 44) and is exposed internally to stagnation pressure $P_t$. The degree of capsule extension therefore corresponds to the differential pressure $q_c = P_t - P_s$. At any given altitude ($P_s$ constant), the differential pressure $q_c$ increases with Mach number; and the free end 46 of capsule 40 therefore moves to the right (as seen in Figs. 1 and 2, for example) with increasing Mach number if $P_s$ is constant.

In accordance with the preferred form of the invention, two fluid passage means are provided for supplying fluid under two distinct pressures, one pressure being supplied to the interior of inner capsule 40 and the other to the interior of the entire chamber defined by cover 30 and base frame 22. The passage means 50 comprises a threaded axial bore 51 in base plate 21, adapted to receive a conduit indicated at 56, and communicating with the interior of capsule 40 via a bore 53 in capsule fitting 43. The passage means 52 comprises a threaded bore 54 adapted to receive a conduit 57 and opening through plate 21 into chamber 42 and thence, via such cut-out portions of the frame as 32, into the entire volume within cover 30 and outside of the two capsules. Capsule 44, in preferred form of the invention, is hermetically sealed, the interior being preferably evacuated. Alternatively, the interior of capsule 44 may be supplied in any suitable manner with fluid under some variable pressure different from that in capsule 40. For example, capsule 44 may be connected to frame bracket 39 by means of a fitting such as fitting 43 of capsule 40, a flexible conduit being provided between the axial passage of that fitting and the exterior of the housing. Such a flexible conduit may be carried through a threaded aperture in frame plate 21, such as bore 54, a suitable pressure sealing fitting of known type being provided at that aperture.

In accordance with one aspect of the invention, each capsule is provided with independent output means acting to develop one or more electrical signals that represent the degree of extension of the respective capsules. The resulting electrical signals may be employed directly to control visual indicators or other apparatus of any desired type. In particular, one signal from each of the capsules may be supplied as input signal to an electrical circuit of remarkably simple type to produce a voltage signal that is a definite function of Mach number, and that can, for example, be made closely linear over a predetermined relatively wide range of values. Preferred signal means for that purpose comprise potentiometers of precision type, the potentiometer winding being preferably mounted on the frame and the brush being movable in response to expansion of the capsule. A particularly accurate and reliable type of linkage between the free ends of the respective capsules and the associated potentiometer brushes is shown illustratively in the drawings.

In a linkage for such a purpose as has been described it is essential to eliminate backlash substantially completely and to combine lightness and freedom from friction with extreme stiffness of the individual parts, so that a definite capsule position corresponds to an entirely definite and uniform position of the potentiometer brush. The present detailed type of linkage has been found to be particularly satisfactory for that purpose.

Each capsule directly controls the movement of one or more potentiometer brushes by means of a single lever of simple and rigid form. That lever comprises a flat plate of generally triangular shape, preferably symmetrical about its longitudinal axis. The lever is mounted on the frame for pivotal movement about a pivot axis that is parallel to the plane of the lever and perpendicular to its longitudinal axis near one end of the lever. The pivot bearings preferably comprise two flexure pivots relatively widely spaced along the pivot axis and close to the lateral edges of the lever. The lever and capsule are so related that the capsule axis lies in the plane of symmetry of the lever, and is substantially perpendicular to the plane of the lever in normal position of the latter, intersecting the lever at an intermediate point of its longitudinal axis. The pivot axis is thus normal to the capsule axis, and it is spaced therefrom by a predetermined distance that is small compared to the length of the lever. The free end of the capsule is preferably connected to the lever by means of a flexure pivot, the axis of which is parallel to the pivot axis of the lever. The pivot axis of that connection and the pivot axis of the lever itself are preferably equally spaced on the same side of the lever, as illustrated.

The drawings illustrate typical linkages of the type described, the two levers for capsules 40 and 44 being shown at 60 and 80, respectively. Lever 60 is mounted on the frame by means of the two flexure pivots 61 and 62, each of which comprises a pair of spaced blocks connected by two crossed leaf springs. Flexure pivot 62, for example, comprises the rectangular block 63, secured by the screw 64 directly to the inner face of lever 60 adjacent one of its lateral edges; the block 65 of L-shape, one leg of that L being secured directly to frame plate 34 by the screw 66; and the two leaf springs 67 and 68. The pivot axis provided by that structure is indicated at 69 and is normal to the paper in Fig. 1 at the crossing of the springs 67 and 68. Pivot 61 of lever 60 and pivots 81 and 82 by which lever 80 is mounted on frame plate 38 are of similar structure, as typically shown, and need not be described in detail. The pivot axis of lever 80, defined by pivots 81 and 82, is indicated at 89. The flexure pivots defining each pivot axis are relatively widely spaced longitudinally of that axis, the width of the lever between points of connection of the pivots being preferably between about one quarter and about one half of the effective length of the lever.

The connection between capsule 40 and lever 60 comprises the flexure pivot 70, of which the block 71 is directly connected to the inner face of lever 60 by the screw 72 on the longitudinal axis 76 of the lever; and the block 73 is mounted by means of the threaded stud 74 and lock nut 75 on the free end 46 of capsule 40. Stud 74 extends freely through an axial aperture 76 in frame plate 34, and is long enough to accommodate the slight curvature of the movement path of the lever without appreciable lateral distortion of the capsule. The crossed springs 77 and 78 extending between blocks 71 and 73 provide an effectively rigid connection with respect to all degrees of freedom except rotation about the axis 79 defined by the crossing of the springs, which is normal to the paper in Fig. 1. That axis may be seen to intersect capsule axis 28 perpendicularly and to be spaced from the plane of lever 60 by the same distance and in the same direction as pivot axis 69 of the lever, already described. A connection of similar structure is shown at 90 between the free end 47 of capsule 44 and lever 80.

Each lever is preferably fully counterbalanced about its pivot axis by a suitable mass, such balancing masses being indicated at 100 and 102 mounted on the levers 60 and 80, respectively, by the bolts 101 and 103. Axial extension of the capsules is preferably limited positively, both to protect the capsules from damage and to prevent the potentiometer brushes, to be described, from leaving their potentiometer coils. Such limitation may be provided for capsule 40 by the limit screws 105 and 106, adjustably threaded in plate 34 on opposite sides of aperture 76 in position to engage the free end of the capsule. Similar screws 107 and 108 in frame plate 38 limit the movement of capsule 44.

An important feature of the present structure is the spatial relation between the two levers 60 and 80. As shown clearly in Fig. 1, those levers lie in spacedly opposed relation and face in opposite directions, the pivot axes 69 and 89 being mutually parallel and equally spaced on opposite sides of frame axis 28. The free end of one lever is thus opposite the pivoted end of the other, with the result that the movement of the free ends, and any mechanisms that may be associated therewith, do not interfere with each other.

The means illustratively shown for developing a signal representing the condition of inner capsule 40 is a potentiometer, comprising the coil 110 and the brush 116. Potentiometer coil 110 may be rigidly mounted on the frame by means of the bracket 112, which is secured to frame plate 34 by the screws 113. Bracket 112 is so formed that the potentiometer coil extends parallel to frame axis 28 and is approximately bisected by the transverse plane through pivot axis 69. The cooperating potentiometer brush 116 may be mounted in electrically insulated relation on the free end of lever 60 by means of a bracket 117, which may conveniently be secured by screws 118 directly to lever 60 on the face opposite to the flexure pivot structures 61, 62 and 70. Coil bracket 112 and brush bracket 117 are preferably adjustable longitudinally of lever 60, as by provision of slotted holes for screws 113 and 118, as indicated at 114 and 119, respectively, in Fig. 3. Such adjustments are not only convenient for producing proper engagement of the brush and coil, but permit appreciable variation of the distance between the potentiometer contact and pivot axis 69, whereby the ratio of amplification of the movement of the capsule may be adjusted. Brush 116 preferably comprises a relatively long arm of sheet spring material, extending parallel to the axis of coil 110 and having at its free end a relatively short arm that extends normally to the coil axis and directly abuts the surface of the coil. That type of brush is more fully described and is claimed in the copending patent application of Carlyle A. Mounteer for Potentiometer Brush, Serial No. 416,019, filed March 15, 1954. Brush bracket 117 preferably includes a straight rod portion 120, on which the brush 116 is frictionally mounted by means of a relatively tight spring clamp 121, permitting convenient rotational adjustment of the brush about the rod axis to regulate the yielding pressure with which the brush engages the potentiometer coil. Spring clamp 121 may be soldered in place after adjustment, or may be sufficiently tight on rod 120 that it provides an effectively rigid mounting for the brush when the instrument is in use.

In the embodiment shown, outer capsule 44 is provided with means for producing two independent electrical signals. Two potentiometer coils 130 and 140 are mounted on frame plate 38 by the brackets 131 and 141, respectively, similar to bracket 112 already described; and two brushes 134 and 144 are mounted independently in electrically insulated relation on the free end of lever 80 by the brackets 136 and 146, respectively, which are similar to bracket 117, already described. As shown clearly in Fig. 3, for example, the two potentiometer assemblies are preferably mounted in symmetrical relation on opposite sides of the longitudinal axis 96 of lever 80. The potentiometer coils 130 and 140 may be identical in mechanical and in electrical properties, particularly if two independent but identical electrical signals are desired, or may be quite different in structure and in electrical properties, particularly if the two signals are desired to correspond to different functions of the capsule movement. In particular, within the broader scope of the invention, all of the potentiometer coils may be tapered in any desired manner to produce non-linear response.

Electrical connections to the potentiometer brushes and coils may be made in any convenient and usual manner, as by light flexible insulated wires, not explicitly shown in the drawings. Electrical leads are preferably brought out of the housing through suitable insulated and pressure sealing fittings in end plate 21 of the frame, one of which is represented illustratively in Fig. 1 at 125 with external electrical terminal at 126.

Figures 3, 5, 7, 8:
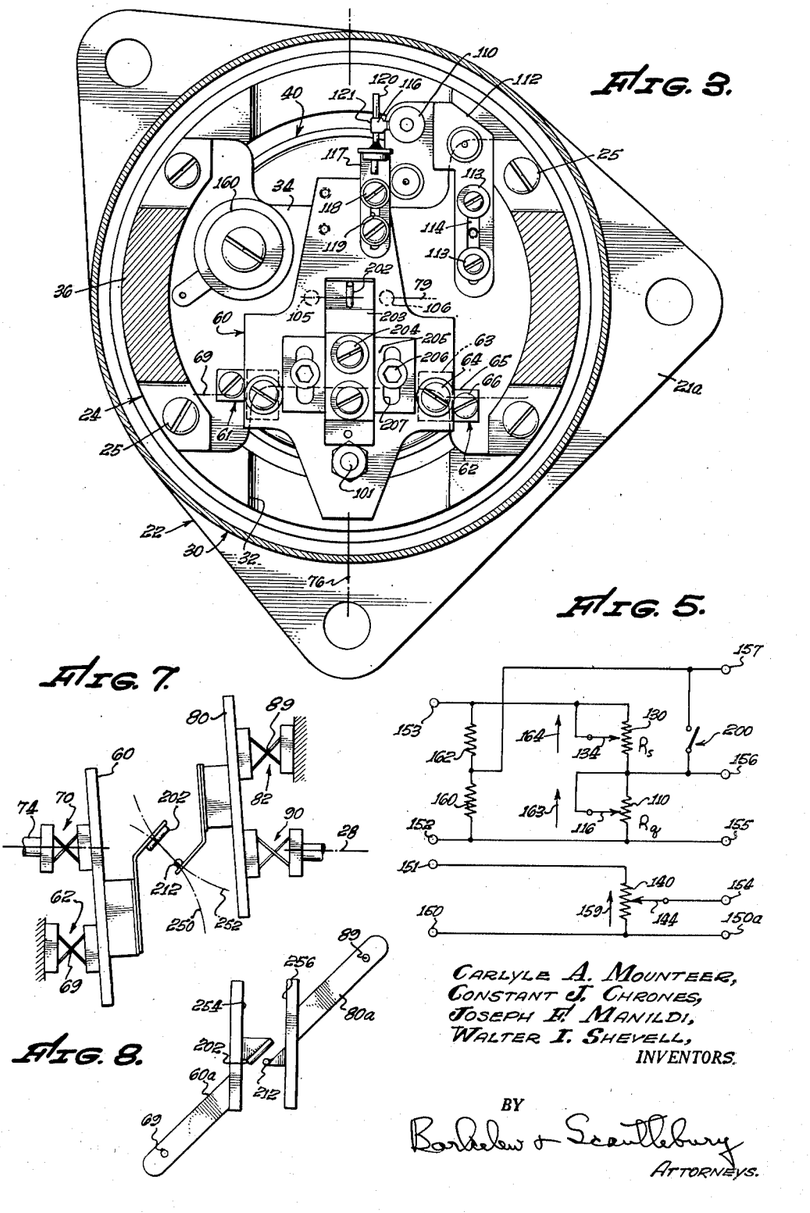
Fig. 3 is a vertical transverse section on line 3—3 of Fig. 1.
Fig. 5 is a schematic diagram of an illustrative electrical circuit which may form a part of the embodiment of Figs. 1 to 4.
Fig. 7 is a schematic diagram corresponding to a portion of Fig. 1 and illustrating operation of a switch.
Fig. 8 is a schematic diagram illustrating an aspect of the invention.

An illustrative example of circuit means for the utilization of output signals from potentiometers such as 110, 130 and 140, is represented in the schematic circuit diagram of Fig. 5. That circuit typically includes means for producing two substantially independent types of output, one representing altitude and the other representing Mach number. The output representing altitude may be derived directly from a potentiometer responsive to static pressure $P_s$. The output representing Mach number may be derived from electric circuitry that includes a potentiometer responsive to stagnation pressure $P_t$ and a potentiometer responsive to static pressure $P_s$, the circuit being such as to produce an output that is a unique function of the ratio of the outputs of those respective potentiometers. As already explained, in preferred form of the invention the capsule that responds to stagnation pressure is also exposed on its other face to static pressure, and the net response is therefore controlled by the differential pressure $q_c = P_t - P_s$.

In the illustrative circuitry of Fig. 5, two input terminals are indicated at 150 and 151, across which a uniform input voltage of any desired type may be applied. Potentiometer winding 140 is connected between input terminals 150 and 151, brush 144 being connected to the output terminal 154. The voltage tapped by brush 144 and supplied as output signal via terminal 154 then varies with the static pressure supplied at conduit 57 and constitutes a measure of the altitude of the aircraft. A direct or an inverse relation between output voltage and altitude may be obtained alternatively by taking as output signal the voltage between terminal 154 and one or other of the two input terminals 150 and 151. For example, if potentiometer brush moves in the direction indicated by the arrow 159 in Fig. 5 with increasing static pressure, the voltage between terminals 154 and 151 will increase with altitude, while that between terminals 154 and 150 will decrease with altitude. A second output terminal for the circuit, may be provided if desired, as illustrated at terminal 150a, connected to input terminal 150.

Figure 4:
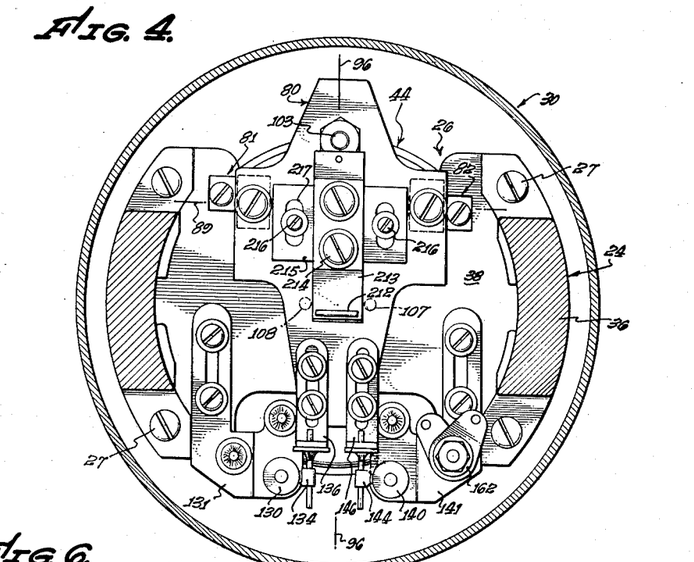
Fig. 4 is a vertical transverse section on line 4—4 of Fig. 1.

A second input circuit is provided, with input terminals 152 and 153, which may be connected to terminals 150 and 151, respectively, or may be supplied with an independent input voltage. Potentiometer windings 110 and 130 are connected in series between terminals 152 and 153, the potentiometer brushes being connected in each instance to one end of the winding, so that the potentiometers function as simple variable resistances. Two output terminals 155 and 156 are connected directly to opposite ends of winding 110. A third output terminal 157 may be connected to the junction of two fixed resistances 160 and 162, which are connected in series between input terminals 152 and 153 and act as a voltage divider. That circuit is illustrative of arrangements in which potentiometer 130 is connected in a dividing network and potentiometer 110 is connected in a multiplying network. Such fixed resistances as 160 and 162 may be mounted externally of the case, but preferably are contained within the case, so that the entire system is self-contained. The present structure provides convenient mounting positions for such units. For example, such fixed resistors may be mounted on frame plate 34, as indicated in Fig. 3 at 160, in the position that would be occupied by a second potentiometer brush bracket if it were necessary to provide a second potentiometer controlled by capsule 40. And such fixed resistors may be mounted on the potentiometer coil brackets, as indicated at 162 on bracket 141 in Figs. 2 and 4.

Figure 6:
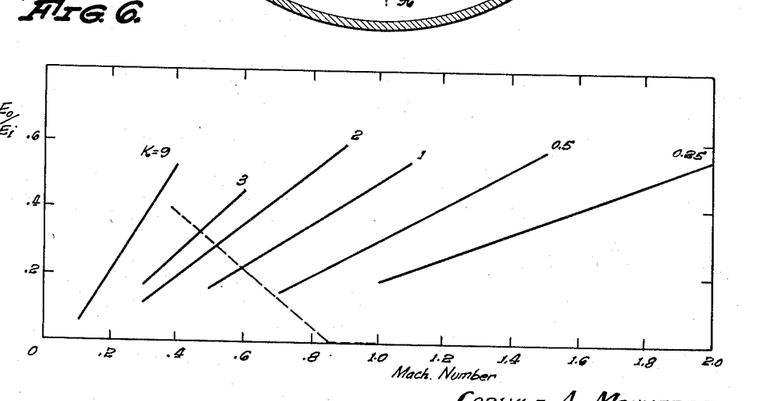
Fig. 6 is a graph illustrating typical output signals in accordance with the invention.

In accordance with one aspect of the invention, both potentiometers of the circuit just described are so adjusted that their brushes would (if not limited by stop means) be at one end of their respective windings for zero pressure difference across the respective capsules; and the brushes are electrically connected to the opposite ends of the windings. The effective resistance of each potentiometer (while free of any stop means) is then directly proportional to the pressure differential across its capsule, increasing linearly with increasing pressure differential. That relation is indicated schematically in Fig. 5 by the arrows 163 and 164. In actual practice, the effective resistance between terminals 152 and 153 ordinarily cannot be allowed to become zero, and the potentiometers are therefore so arranged that their effective resistance cannot become less than some definite value. That may be done by providing mechanical stops, or, preferably, by inserting a fixed resistance in series with one or both of the potentiometer windings, that resistance being considered as part of the winding in determining the zero position of the brush. With the described type of connection, and with the conduits 56 and 57 connected to sources of stagnation and static pressure, respectively, the effective resistance of winding 130 is proportional to $P_s$ and may be represented as $R_s = k_s P_s$; and the effective resistance of winding 110 is proportional to the differential pressure $q_c = P_t - P_s$ and may be represented as $R_q = k_q q_c$. Under those conditions, the output voltage $E_o$ between output terminals 155 and 156 is given by $$E_o = E_i \frac{k_q q_c}{k_s P_s + k_q q_c} \quad (1)$$

where $E_i$ represents the input voltage between input terminals 152 and 153. An output signal from a circuit of the type described is a definite function of Mach number M, and is substantially independent of the altitude of the aircraft. It has been found that the signal for definite selected values of $k_q$ and $k_s$ includes a portion that closely approximates a linear function of Mach number over an appreciable range of values of that number, and includes other portions that are non-linear functions of Mach number. The particular range of Mach numbers in which the output signal has a desired type of behavior can be controlled in practice by selection of an appropriate value of the ratio $K = k_q/k_s$. In Fig. 6 the solid lines represent the substantially linear portions of the output signal for a circuit of the type shown in Fig. 5, expressed in terms of $E_o/E_i$, the ratio of the output to the input voltages, and plotted against the Mach number M for several illustrative values of the ratio K. Such a substantially linear function of Mach number may, for example, be utilized for deriving a signal proportional to true air speed, taking proper account in any known manner of the absolute free stream temperature.

In practice, the ratio K depends jointly upon several structural factors of the apparatus, including the ratio of the rates of the two capsules, that is, of their extension per unit pressure differential applied to them; the mechanical advantage ratio provided by the levers 60 and 80; and the ratio of resistance per unit length of the potentiometer windings 110 and 130. Substantially any desired value of K may be obtained by suitably coordinated selection of those several ratios in the design and construction of any particular instrument.

For any selected value of K, and for the corresponding definite function of Mach number represented by the output voltage at terminal 156, the values of fixed resistors 160 and 162 may be so selected that the uniform voltage standing at terminal 157 corresponds to the voltage produced at terminal 156 for a definite predetermined value of Mach number. The output voltage taken between output terminals 156 and 157 is then zero for that predetermined Mach number, and varies from zero in accordance with the selected functional relation as the Mach number departs from that value. In particular, if the selected value lies on the substantially linear portion of the output response, and if the input voltage is a direct current voltage, the output voltage will vary substantially linearly with Mach number and will change polarity at the selected value. Alternatively, if the input voltage is an alternating current voltage, the output may be made to vary linearly, and to change phase at the selected value of Mach number. An output voltage of such particular type may be required for control of auxiliary equipment, and is typical of the wide variety of output signals that may be developed in accordance with the present invention.

In accordance with the invention, the linear potentiometer coils illustrated in Figs. 1 to 4 may be replaced by card windings of any desired non-linear type. It is preferred to use non-linear windings of such a type that the effective resistance between the brush and one end of the winding is proportional to a definite power (different from unity) of the controlling pressure. Such a relation may be expressed, for example, as $R = kP^n$, where $n$ is the power in question. A wide variety of functions of Mach number may be obtained by employing two non-linear potentiometer windings of that type, controlled in the typical manner already described for potentiometers 110 and 130, the power $n$ being the same for both potentiometers. It has been found that the output signal from such a system, as well as from a system employing only linear potentiometers, is a unique function of Mach number, and is independent of altitude. In particular, the functions that result from such a device with the power $n$ equal to approximately 0.9 have been found to have in general a substantially linear portion that extends over a somewhat wider range of Mach number values than when $n$ is unity.

In accordance with a further aspect of the invention, a switch is provided in association with the lever structure already described and so arranged as to operate at a definite predetermined value of Mach number. Such a switch is indicated at 200 in Fig. 1, comprising two switch contact assemblies mounted on the opposing faces of the respective levers 60 and 80. Each switch contact assembly comprises a contact element and a mounting for that element which normally supports it in definite position with respect to the lever. That position is preferably adjustable longitudinally of the lever, and at least one of the switch elements is preferably resiliently mounted in such a manner that the switch element may be deflected yieldingly from its normal position when engaged by the other switch element. That type of yielding support, which is preferably provided for both switch elements, has the advantage that movement of the levers in a direction to close the switch does not become blocked upon switch closure. Structure in accordance with the present invention may be utilized to produce a signal by switch actuation only, to develop output signals from one or more potentiometers or the like only or, preferably, to produce coordinated control of both types of output, as in the present illustrative embodiment.

As shown, contact elements 202 and 212 are mounted on the free ends of the resilient arms 203 and 213, respectively, the other ends of the arms being rigidly connected by the screws 204 and 214 to the respective mounting blocks 205 and 215, preferably of insulating material. The mounting blocks are secured directly to the opposing faces of the levers 60 and 80, respectively, by the screws 206 and 216. Slotted holes are preferably provided for screws 206 and 216, as indicated at 207 and 217, to facilitate adjustable movement of the contact elements longitudinally of the respective levers.

Each of the contact elements preferably is of such form as to provide a substantially straight contact edge, one of those edges (that of element 202 in the present embodiment) extending substantially radially with respect to the pivot axis 69 of the lever on which it is mounted; and the other contact edge (that of element 212 in the present embodiment) extending substantially axially with respect to the pivot axis 89 of its lever. The radial extent of the one contact edge insures effective contact over the whole range of lever positions that lead to such contact, while the axial extent of the other contact edge avoids the necessity of perfect alignment of the structure in the axial direction. The cooperative action of the two crossed contact edges insures substantially point contact between the two contact elements.

A switch of the type described may be connected in a wide variety of circuits in a manner to change the nature of the circuit output when the Mach number passes through the predetermined critical Mach number at which switch actuation occurs. That switch actuation may comprise opening or closure, or both types of operation may be utilized. Such actuation may be utilized directly, or may act indirectly, for example by control of a relay or similar device.

Switch 200 may be connected, for example, in a potentiometer signal circuit such as that already described, and will then act to alter the nature of the output from that circuit at the predetermined value of Mach number at which the switch is set to operate. As typically shown in Fig. 5, switch 200 may be connected between output terminals 156 and 157 of the potentiometer circuit, and may be set to close with increasing Mach number at any desired value of Mach number. As an illustrative example, that critical value of Mach number may be the value at which the voltage between those terminals reaches zero by virtue of such action of the potentiometers 110 and 130 as has been described. The effect of that type of action is to insure that the output voltage, having reached zero at that predetermined Mach number, remains zero at all higher values of Mach number. The dashed curve in Fig. 6 represents the type of output between terminals 156 and 157 that may be obtained by such action of switch 200. The oblique portion of that curve corresponds to normal potentiometer action with the described circuit, with $K=2$, and with resistances 160 and 162 selected to produce zero output at the illustrative Mach number 0.85; and the horizontal toe portion of the curve represents the uniform output of zero voltage that results from closure of switch 200 at Mach number values above 0.85. The described resilient mounting of at least one, and preferably both, of the switch contact elements permits the levers to continue their movement under control of the respective capsules in either direction substantially unaffected by switch operation. That has the advantage that, if the Mach number continues to increase after switch closure has effectively locked one signal output at a predetermined value, an independent output, such as that from terminals 154 and 150 in the present embodiment (Fig. 5), may be substantially unaffected and may continue to represent the input pressure in substantially the normal manner.

In the particular embodiment shown, connected in the manner described, the position of levers 60 and 80 and of their associated switch contacts 202 and 212 for zero air speed (Mach number zero) and for elevation at sea level may typically be as indicated schematically in Fig. 7, with both capsules fully compressed, and with the levers in slightly oblique but mutually parallel positions.

Movement of lever 80 in response to variation of static pressure externally applied to outer capsule 44 causes switch contact 212 to swing progressively along the arc 252 about pivot axis 89 in a direction toward contact 202 as the elevation of the aircraft increases. Movement of lever 60 in response to variations of the differential pressure $q_c$ acting on inner capsule 40 causes switch contact 202 to swing progressively along the circular arm 250 about pivot axis 69 in a direction toward contact 212 with increasing $q_c$, and hence with increasing Mach number, at any given elevation. Because of the described movement of contact 212, progressively less movement of contact 202 from its initial position suffices to cause switch closure as the elevation increases. Since the total angular movement of the levers is relatively small, the curvature of the paths 250 and 252 may be neglected for most practical purposes, and the switch contacts may be considered to move along the tangents to those curves at their intersection. With the symmetrical arrangement of Fig. 7, those tangents are parallel.

It has been discovered that a switch actuating structure of the type described is capable of producing switch actuation at a substantially uniform predetermined value of Mach number, regardless of wide variations in elevation. To obtain such switch actuation at a particular value of Mach number, the invention provides mechanism for moving the two switch elements independently in direct proportion to the magnitudes of the respective pressures that control them, the ratio of the constants of proportionality for those two movements being made equal to the ratio of the corresponding pressures at the desired value of Mach number. In the present embodiment, in which the two effective controlling pressures are the static pressure $P_s$ and the differential pressure $q_c = P_t - P_s$, the movement of the two contact elements 202 and 212 along their respective paths of movement may be expressed as $C_q q_c$ and $C_s P_s$, respectively, where $C_q$ and $C_s$ are constants of proportionality. In accordance with the present aspect of the invention, the ratio $C = C_q/C_s$ is made equal to the reciprocal of the ratio $q_c/P_s$ that corresponds to the desired value of Mach number. The latter value may be determined empirically, or may be obtained, for example, from the known expression for Mach number M in terms of $P_s$, $q_c$, and the ratio $k$ of specific heats for air:

$$M^2 = \frac{2}{k-1}\left[\left(1 + \frac{q_c}{P_s}\right)^{\frac{k-1}{k}} - 1\right] \quad (2)$$

If it should be preferred to control the respective switch elements in direct proportion to the stagnation pressure $P_t$ and $P_s$, or to $q_c$ and $P_t$, rather than to $q_c$ and $P_s$ as in the present embodiment, the proper ratio of proportionality constants may be obtained from the corresponding expression for M, obtainable from (2) by substitution.

In practice, the ratio $C = C_q/C_s$, defined above, may be controlled over wide limits by selection of capsules or equivalent pressure responsive devices having predetermined rates of pressure response in a definite ratio; by use of linkages, such as levers 60 and 80, acting to amplify the capsule movements in a definite ratio; and by the detailed positions of the switch elements on their respective levers. Those positions are preferably adjustable, as already described, providing a convenient fine adjustment of the overall value of C and hence of the Mach number $M_o$ at which the instrument is adapted to operate. With C thus determined, it is only necessary that the spacing of the switch elements be such that they just touch at the selected Mach number $M_o$ at any one altitude. Switch actuation will then occur at that same Mach number at all altitudes.

In the present embodiment, for example, if capsule 40 moves twice as far as capsule 44 for a given applied pressure differential, the value of C, so far as the capsule rates are concerned, is 2. A value of $q_c/P_s$ equal to the reciprocal of 2 corresponds to a Mach number $M_0$ of approximately 0.78. The value of C may be further adjusted by shifting both switch contact assemblies on their respective levers in a manner to alter the ratio of their radii from their respective pivot axes. And the spacing between the contacts for any given pressure conditions may be adjusted by shifting the contacts on their respective levers along their respective lines of movement.

The present structure provides both those types of adjustment in particularly convenient form. That is accomplished by providing a single adjustment for each contact along a direction that is oblique with respect to the radius drawn to the contact from its pivot axis. As shown schematically in Fig. 8, the switch elements may be considered (in any given position of adjustment) to be mounted on the ends of effective levers $60a$ and $80a$ that extend substantially radially from the respective pivot axes 69 and 89 to the switch elements, and are actuated by the respective capsules in any suitable manner, not illustrated in that schematic view. That viewpoint tends to emphasize the fact, already pointed out, that the contact edge of contact 202 extends radially and that of contact 212 extends axially with respect to the respective pivot axes. The preferred type of adjustable movement of the contacts is represented in Fig. 8 as movement along oblique guide surfaces 254 and 256, provided near the outer ends of the radially directed levers $60a$ and $80a$, along which surfaces the respective contact elements may be adjustably shifted. A particular feature of that type of oblique adjustment results from the fact that movement along the guide surfaces 254 or 256 has a radial as well as a tangential component. The same is true of the adjustable movement of the switch elements along the faces of levers 60 and 80, due to the fact that the pivot axes 69 and 89 are spaced from the planes of the levers. Movement of both switch elements in the same direction (that is, both up, or both down, as seen in Figs. 1, 7 and 8) along the oblique guide surfaces varies the ratio of the effective radii of the contacts about their pivot axes, and therefore varies the effective value of C. And movement of the switch elements in opposite directions along those guide surfaces varies the tangential spacing between them without substantially affecting the value of C.

In the claims, the term "capsule," when not otherwise expressly limited, is employed broadly in the sense of a container that is axially expansible in response to differences of fluid pressures acting on its interior and its exterior.

We claim:

1. A pressure responsive device, comprising a rigid frame, two pressure responsive means mounted on the frame, conduit means for supplying fluid under predetermined pressures to the respective pressure responsive means, two linkage members movably mounted with respect to the frame, the pressure responsive means being operatively connected to the respective linkage members, signal means acting between the frame and the respective linkage members to develop respective continuously variable electrical signals that represent the pressures acting upon the respective pressure responsive means, electric circuit means responsive to said electrical signals, said circuit means being capable of two alternative conditions characterized by different types of response to the said signals, and control means acting between the two linkage members to shift the electric circuit means between its said conditions in response to a predetermined mutual relationship between the pressures acting upon the respective pressure responsive means.

2. A pressure responsive device, comprising a rigid frame, two pressure responsive means, each pressure responsive means having a displacement axis and including a base portion fixedly mounted on the frame with the displacement axes of the two pressure responsive means in substantial alignment and a movable portion axially movable in response to applied fluid pressure, two levers pivoted on the frame on respective mutually parallel pivot axes spaced on opposite sides of the displacement axes, the movable portions of the pressure responsive means being operatively connected to the respective levers at intermediate points thereof, means acting between the frame and the free ends of the respective levers to develop continuously variable electrical signals representing the rotational positions of the levers about their pivot axes, electric circuit means responsive to said electrical signals, said circuit means being capable of two alternative conditions characterized by different types of response to the said signals, and means acting between the two levers to shift the electric circuit means between its said conditions in response to a predetermined mutual relationship of the two levers.

3. A pressure responsive device, comprising a rigid frame, two levers independently pivoted on the frame on respective mutually parallel pivot axes, two pressure responsive capsules operatively connected to the respective levers, means for supplying fluid under static pressure to the exterior of both capsules, means for supplying fluid under stagnation pressure to the interior of one capsule, the other capsule being hermetically sealed, electrical signal means comprising elements mounted respectively on the levers and on the frame and acting to develop electrical signals that represent the movements of the respective levers with respect to the frame, an electrical switch comprising two engageable switch contacts mounted on the respective levers in mutually opposed relation and responsive to a predetermined value of Mach number, and an output circuit responsive to the said electrical signals and including the said switch, the output circuit acting in one condition of the switch to develop an output signal representing Mach number and acting in the other condition of the switch to develop a predetermined constant signal.

4. A pressure responsive device, comprising a rigid frame, two levers independently pivoted on the frame on respective mutually parallel pivot axes, two pressure responsive capsules operatively connected to the respective levers, means for supplying fluid under static pressure to the exterior of both capsules, means for supplying fluid under stagnation pressure to the interior of one capsule, the other capsule being hermetically sealed, electrical signal means comprising elements mounted respectively on the levers and on the frame and acting to develop electrical signals that represent the movements of the respective levers with respect to the frame, an electrical switch comprising two engageable switch contacts, mounting means for supporting the switch contacts with respect to the respective levers in definitely predetermined normal positions in which the switch is responsive to a predetermined value of Mach number, at least one of the mounting means including resilient means permitting yielding displacement of the corresponding switch element from its normal position, first output means responsive to at least one of the said signals and to actuation of the switch and acting in one condition of the switch to develop an output signal representing Mach number and acting in the other condition of the switch to develop a predetermined constant signal, and second output means responsive to at least the other said signal and substantially independent of the condition of the switch.

5. A pressure responsive switch, comprising a rigid frame, two pressure responsive capsules mounted on the frame, two levers independently pivoted on the frame on respective mutually parallel pivot axes, the capsules being operatively connected to the respective levers, structure on the respective levers forming guide surfaces, two engageable switch contacts, means mounting the switch contacts on the respective guide surfaces for adjustable movement along the length thereof, and releasable means for anchoring the switch contacts in definite adjusted positions on those surfaces, said guide surfaces extending obliquely with respect to their radial distances from their respective pivot axes and substantially parallel to each other, means for supplying fluid under static pressure to one capsule, and means for supplying fluid under stagnation pressure to the other capsule.

References Cited in the file of this patent

UNITED STATES PATENTS

| | | |
|---|---|---|
| 2,604,117 | Angst | July 22, 1952 |
| 2,609,686 | Peterson | Sept. 9, 1952 |
| 2,622,177 | Klose | Dec. 16, 1952 |
| 2,656,429 | Tietjen | Oct. 20, 1953 |
| 2,671,620 | Andrews | Mar. 9, 1954 |

FOREIGN PATENTS

| | | |
|---|---|---|
| 442,497 | Great Britain | Nov. 24, 1934 |